US012454992B2

(12) United States Patent
Piotrowski et al.

(10) Patent No.: US 12,454,992 B2
(45) Date of Patent: Oct. 28, 2025

(54) SYSTEMS AND METHODS FOR SEQUENTIAL OPERATION FOR MULTIPLE INPUT/OUTPUT SYSTEMS

(71) Applicant: Woodward, Inc., Fort Collins, CO (US)

(72) Inventors: Maciej J. Piotrowski, Chicago, IL (US); Christopher R. Jarr, Elgin, IL (US); Bryan R. Dawe, Palatine, IL (US); Aristotelis J. Pirillis, Chicago, IL (US)

(73) Assignee: Woodward, Inc., Fort Collins, CO (US)

( * ) Notice: Subject to any disclaimer, the term of this patent is extended or adjusted under 35 U.S.C. 154(b) by 96 days.

(21) Appl. No.: 18/466,683

(22) Filed: Sep. 13, 2023

(65) Prior Publication Data

US 2024/0093780 A1   Mar. 21, 2024

Related U.S. Application Data

(60) Provisional application No. 63/407,356, filed on Sep. 16, 2022.

(51) Int. Cl.
*F16H 1/22*  (2006.01)
(52) U.S. Cl.
CPC ..................................... *F16H 1/22* (2013.01)
(58) Field of Classification Search
CPC ........ F16H 1/22; F16H 37/08; F16H 37/0813; F16H 31/004
See application file for complete search history.

(56) References Cited

U.S. PATENT DOCUMENTS

| 4,186,624 A | * | 2/1980 | Fessett | F16H 35/00 |
| | | | | 475/15 |
| 12,006,988 B2 | * | 6/2024 | Guiroult | F16D 11/14 |
| 2022/0186793 A1 | * | 6/2022 | Guiroult | F16D 7/044 |

FOREIGN PATENT DOCUMENTS

| CN | 100999292 B | 7/2010 |
| EP | 3959449 A1 | 3/2022 |
| WO | 2018165231 A1 | 9/2018 |

OTHER PUBLICATIONS

Int'l Search Report and Written Opinion Appln No. PCT/US2023/032710 mailed Jan. 4, 2024.
Int'l Preliminary Report on Patentability Appln No. PCT/US2023/032710 mailed Mar. 27, 2025.

* cited by examiner

*Primary Examiner* — Bobby Rushing, Jr.
(74) *Attorney, Agent, or Firm* — McAndrews, Held & Malloy, Ltd.

(57) ABSTRACT

Methods and systems for a gear mechanism that includes one or more actuators operable to activate or deactivate in order to drive or be driven by sequential engagement with one or more cam features incorporated within an interior of a ring gear.

19 Claims, 10 Drawing Sheets

| Sequence | Actuator #1 | | | Actuator #2 | | |
|---|---|---|---|---|---|---|
| | Position | Action | Ratchet Pawl State | Position | Action | Ratchet Pawl State |
| 1 - no command | Retracted | Able to extend | Unlocked | Retracted | Hold position | Locked |
| 2 - Commanded to Open (Typ) | Towards Retract | Extending - (has ability to extend or retract) | Unlocked | Retracted | Hold position with pawl contacted - will not extend | Locked |
| 3 - Unlock #2 to allow Extension | Towards Extend | Extending - (has ability to extend or retract) | Unlocked | Retracted | Release lock to begin extension | Unlocked |
| 4 - Continue Travel into #1 Hardstop | Towards Extend into Hardstop | Extending - (has ability to extend or retract) | Unlocked | Towards Retract | Extending - (has ability to extend or retract) | Unlocked |
| 5 - Lock #1 to prevent Retraction | Full Extend Stroke | Engage Lock in Position, actuator driving into hardstop - will not retract | Locked | Towards Retract | Extending - (has ability to extend or retract) | Unlocked |

FIG. 11A

| Sequence | Actuator #1 | | | Actuator #2 | | |
|---|---|---|---|---|---|---|
| 6 - Continue Travel into #2 Hardstop | Full Extend Stroke | Engage Lock in Position, actuator driving into hardstop - will not retract | Locked | Full Extend Stroke | Able to retract | Unlocked |
| 7 - Commanded to Close (Typ) | Full Extend Stroke | Hold position with pawl contacted - will not retract | Locked | Towards Extend | Retracting - (has ability to extend or retract) | Unlocked |
| 8 - Unlock #1 to allow Retraction | Full Extend Stroke | Release Lock to begin Retraction | Unlocked | Towards Retract | Retracting - (has ability to extend or retract) | Unlocked |
| 9 - Continue Travel into #2 Hardstop | Towards Extend | Retracting - (has ability to extend or retract) | Unlocked | Towards Retract into Hardstop | Retracting - (has ability to extend or retract) | Unlocked |

FIG. 11B

| Sequence | Actuator #1 | | | Actuator #2 | | |
|---|---|---|---|---|---|---|
| 10 - Lock #2 to prevent Extension | Towards Extend | Retracting - (has ability to extend or retract) | Unlocked | Full Retract Stroke | Engage Lock in Position, actuator driving into hardstop - will not extend | Locked |
| 11 - Continue Travel into #1 Hardstop | Towards Retract into Hardstop | Able to extend | Unlocked | Full Retract Stroke | Engage Lock in Position - will not extend | Locked |

FIG. 11C

SYSTEMS AND METHODS FOR SEQUENTIAL OPERATION FOR MULTIPLE INPUT/OUTPUT SYSTEMS

PRIORITY CLAIM/INCORPORATION BY REFERENCE

This application is a Non-Provisional Patent Application of U.S. Provisional Patent Application No. 63/407,356 entitled "Systems And Methods For Sequential Operation For Multiple Input/Output Systems" filed Sep. 16, 2022, which is herein incorporated by reference in its entirety.

FIELD

Certain embodiments of the disclosure relate to a gear mechanism to sequentially drive multiple input/output systems. More specifically, certain embodiments of the disclosure relate to a gear mechanism that includes a cam and locking mechanism for each of a first and second actuator, the gear mechanism operable to sequentially drive the first and second actuators. Advantageously, the gear mechanism is operable by manual and electric inputs.

BACKGROUND

Sequencing between inputs/outputs in a mechanically driven system often requires external selection by manual or electrical means, which can be heavy, costly, and require frequent maintenance.

Therefore, a simple mechanical system that provides sequential operation of multiple inputs/outputs is desirable.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method is provided for a gear mechanism to sequentially drive multiple outputs. In an example, a gear mechanism includes an input to receive mechanical torque. A primary ring gear including first and second cam features along an interior of the primary ring gear, the primary ring gear to receive the rotational timing from the input. First and second locking pawls are operable to engage and disengage in response to a position of the first and second cam features along the interior of the primary ring gear. First and second sprockets operable to lock and unlock based on a position of the first and second cam features relative to the first and second locking pawls. First and second outputs mechanically connected to the first and second sprockets, the first and second outputs operable to be driven by rotation of the primary input based on engagement of the first and second locking pawls.

Certain embodiments of the present technology include a gear mechanism. The gear mechanism includes an input to receive mechanical torque and a primary ring gear including first and second cam features along an interior of the primary ring gear. The primary ring gear is driven to rotate by the input. The gear mechanism includes first and second locking plates and first and second locking pawls operable to engage and disengage the first and second locking plates, respectively, in response to a position of the first and second cam features along the interior of the primary ring gear. The first and second locking plates are operable to lock and unlock based on a position of the first and second cam features relative to the first and second locking pawls. The gear mechanism includes first and second outputs that are mechanically connected to the first and second locking plates, respectively, and the first and second outputs are operable to be driven by rotation of the input based on disengagement of the first and second locking pawls with the first and second locking plates, respectively.

The first and second pawls may be positioned on opposite sides of the primary ring gear. The first and second pawls may be rotatably mounted to one or more rods extending from the housing toward the primary ring gear. The first and second pawls may include first and second locking tips, respectively, that are configured to lockingly engage the first and second locking plates, respectively. The first and second pawls may engage the first and second locking plates, respectively, in a sequence. When the first locking tip of the first pawl engages the first locking plate, the first output may be locked, and when the second locking tip of the second pawl engages the second locking plate, the second output may be locked. The primary ring gear may rotate to a first point where the first cam feature engages the first pawl, causing the first pawl to disengage from the first locking plate such that the first locking plate can rotate and drive the first output. The primary ring gear may rotate to a second point where the first cam feature no longer engages the first pawl, causing the first pawl to rotate toward the first locking wheel and lockingly engage the first locking wheel such that the first output is locked. The first and second pawls may include first and second rollers, respectively, that follow an interior rim of the primary ring gear and that engage the first and second cam features, respectively. The first and second locking plates may each have at least one step for engaging the first and second pawl, respectively. The first and second locking plates may be sprockets. The primary ring gear may be driven by a timing spur gear train that is driven by the input.

Certain embodiments of the present technology include a gear mechanism having an input to receive mechanical torque and a primary ring gear including first and second cam features along first and second interior rims of the primary ring gear. The primary ring gear is driven to rotate by the input. The first and second locking plates are on opposite sides of the primary ring gear and are configured to rotate with respect to the primary ring gear. The gear mechanism includes first and second locking pawls on opposite sides of the primary ring gear that are operable to engage and disengage the first and second locking plates, respectively, in response to a position of the first and second cam features along the first and second interior rims, respectively, of the primary ring gear. The first and second pawls are configured to rotate toward and engage the first and second locking plates, respectively, when the first and second pawls engage the first and second interior rims, respectively, and the first and second pawls are configured to rotate away and disengage from the first and second locking plates, respectively, when the first and second pawls engage the first and second cam features, respectively. The first and second locking plates are operable to lock when engaged by the first and second pawls, respectively, and unlock when disengaged from the first and second locking pawls, respectively. The gear mechanism includes first and second outputs that are mechanically connected to the first and second locking plates, respectively, and the first and second outputs are operable to be driven by rotation of the input based on disengagement of the first and second locking pawls with the first and second locking plates, respectively.

The first and second pawls may engage the first and second locking plates, respectively, in a sequence. The first and second pawls may include locking tips, and when the first locking tip of the first pawl engages the first locking plate, the first output is locked, and when the second locking tip of the second pawl engages the second locking plate, the second output is locked. The primary ring gear may rotate to a first point where the first cam feature engages the first pawl, causing the first pawl to disengage from the first locking plate such that the first locking plate can rotate and drive the first output. The primary ring gear may rotate to a second point where the first cam feature no longer engages the first pawl, causing the first pawl to rotate toward the first locking wheel and lockingly engage the first locking wheel such that the first output is locked. The first and second pawls may include first and second rollers, respectively, that roll along the first and second interior rims, respectively, and that rollingly engage the first and second cam features, respectively. The first and second locking plates may each have at least one step for engaging the first and second pawls, respectively.

Certain embodiments of the present technology include a gear mechanism having an input to receive mechanical torque and a primary ring gear including first and second cam features along first and second interior rims of the primary ring gear. The primary ring gear is driven to rotate by the input. The gear mechanism includes first and second locking plates on opposite sides of the primary ring gear that are configured to rotate with respect to the primary ring gear. The gear mechanism includes first and second locking pawls on opposite sides of the primary ring gear that are configured to rotate with respect to the primary ring gear and the first and second locking plates and that include first and second rollers, respectively. The primary ring gear rotates to (i) a first point where the first roller of the first locking pawl rolls along the first cam feature, which causes the first locking pawl to be disengaged from the first locking wheel, and the second roller of the second locking pawl rolls along the second interior rim, which causes the second locking pawl to be positioned to lockingly engage the second locking wheel, and (ii) a second point where the first roller of the first locking pawl rolls along the first rim, which causes the first locking pawl to be positioned to lockingly engage the first locking wheel, and the second roller of the second locking pawl rolls along the second cam feature, which causes the second locking pawl to be disengaged from the second locking wheel. The gear mechanism includes first and second outputs that are mechanically connected to the first and second locking plates, respectively. The first and second outputs are operable to be driven by rotation of the input based on disengagement of the first and second locking pawls with the first and second locking plates, respectively.

These and various other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The figures are not necessarily to scale. Where appropriate, similar or identical reference numbers are used to refer to similar or identical components.

DETAILED DESCRIPTION

Disclosed are gear mechanisms with multiple outputs. In some example applications, the multiple outputs, and/or actuators driven by those outputs, have different desired output travel lengths (e.g., amount of time the output/actuator is to be driven). By way of example only, the gear mechanisms may be used to open and close an airplane door, with the first output being connected to a latching device for locking and unlocking the door, and the second output being connected to a lifting device for opening and closing the door.

As disclosed herein, a single ring gear of the gear mechanism is used that contains multiple cam features about an inner diameter of the ring gear. The ring gear is connected to the differential input with a spur gearing ratio that reduces the ring gear rotation to less than one revolution per full travel of both actuators. Each actuator is connected to an output that is in turn connected to a locking plate or sprocket located on one side of the ring gear. A ratcheted locking pawl is located on and connected to each side of the ring gear. Based on the location and dimensions of cam features on the ring gear (corresponding to relative travel time for each actuator), each respective cam feature engages and disengages each ratcheted locking pawl based on the direction of travel of each actuator. Engagement of a pawl with a locking plate locks the locking plate, and, thus, stops motion or travel of the actuator (e.g., rotational, linear, etc.). In some examples, when the first actuator drives away from a hard stop (e.g., a point at which the actuator is prevented from rotating), the locking pawl corresponding to the second actuator is engaged and grounded such that travel only occurs in the first actuator.

The torque output transitions from one output to the other when the first actuator reaches its hard stop, providing a grounding point (e.g., typically occurring in a system outside of this gear mechanism). When retracting back from both actuators at full extend, the opposite grounding approach is used, with the locking pawl corresponding to the first actuator is engaged and grounded such that the second actuator can be the first to retract.

The output then transitions to the first actuator once the second actuator reaches its hard stop, providing a (typically external) grounding point.

In some examples, if external grounding points are not being employed, then another set of ratchet pawl and sprocket plate can be added to each output of the differential, or alternate grounding features can be built into the disclosed gear mechanism. Additional outputs (beyond first and second outputs) may be added to the disclosed gear mechanism as particular system requirements dictate. Such features and/or components may be externally located and operable to contact and control movement of the actuators, e.g., through the various gears disclosed herein.

As utilized herein, "and/or" means any one or more of the items in the list joined by "and/or". For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" refers to functions that can be implemented in hardware, software, firmware, or any combination of one or more thereof. As utilized herein, the term "exemplary" means serving as a non-limiting example, instance, or illustration.

Figure 1:
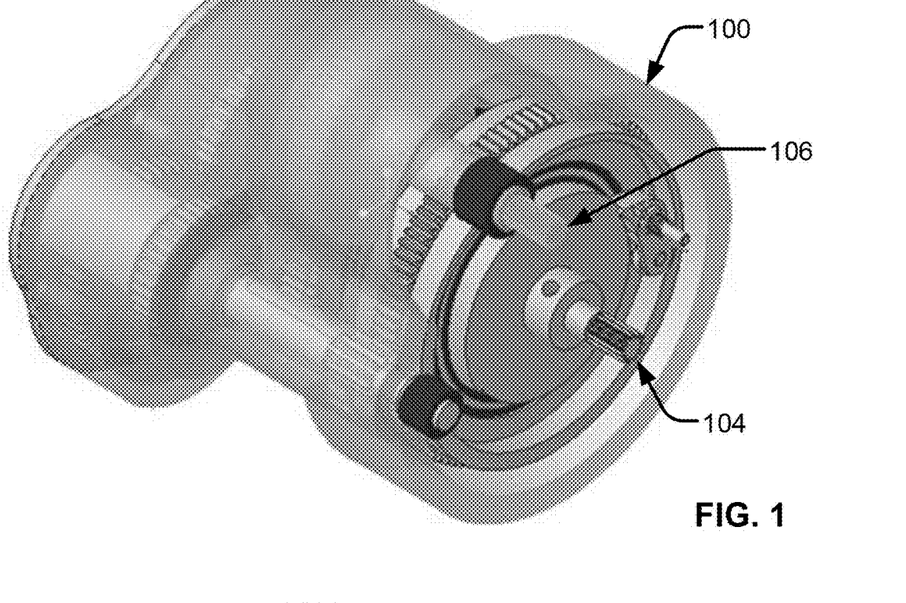
FIG. 1 illustrates a front perspective view of a gear mechanism for multiple output systems, in accordance with an example embodiment of the disclosure.
Figure 2:
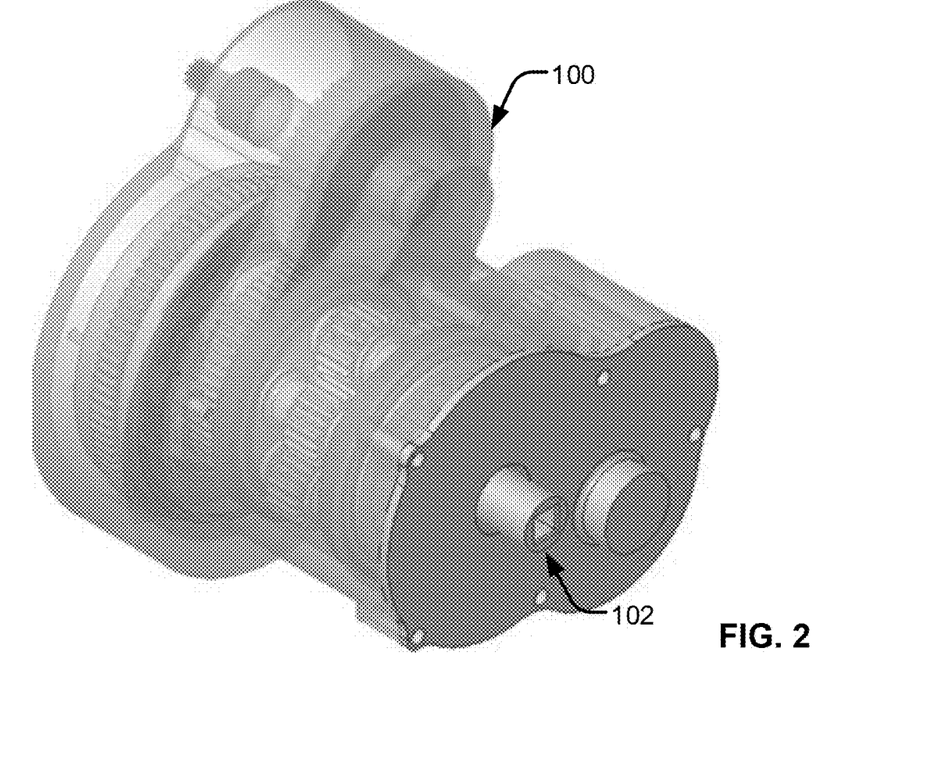
FIG. 2 illustrates a rear perspective view of the gear mechanism for multiple output systems of FIG. 1, in accordance with an example embodiment of the disclosure.

FIGS. 1 and 2 show perspective views of a multi-branch epicyclic differential output mechanism 100, in accordance with an example embodiment of the disclosure. FIG. 1 shows the output side of the mechanism 100, and FIG. 2 shows the input side of the mechanism 100. It may be desirable for multiple actuators to be driven in a predictable, sequential order by the mechanism 100. In an example, following a given operation of a first actuator (e.g., traversal of a full stroke or rotation), it may be desirable to drive a second actuator. The gear mechanism 100 includes an input 102 that can be manually driven (e.g., via a crank) and/or electrically driven (e.g., via a motor, gear, or actuator) and outputs 104, 106. Each output 104, 106 is configured to rotate and may be connected to a different actuator, i.e., a first and second actuator, respectively (not shown). By way of example only, the first actuator may be a locking device, and the second actuator may be a lifting device. The outputs 104, 106 are operable to maintain their respective positions when exchanging manual for electric inputs, or vice versa, at any point along each actuator's stroke.

Advantageously, in some examples the gear mechanism 100 sequentially drives the first and second outputs 104 and 106 and allows for engagement of a grounding feature. For example, the grounding feature can selectively engage or disengage an actuator connected to the outputs 104 and 106.

Figure 3:
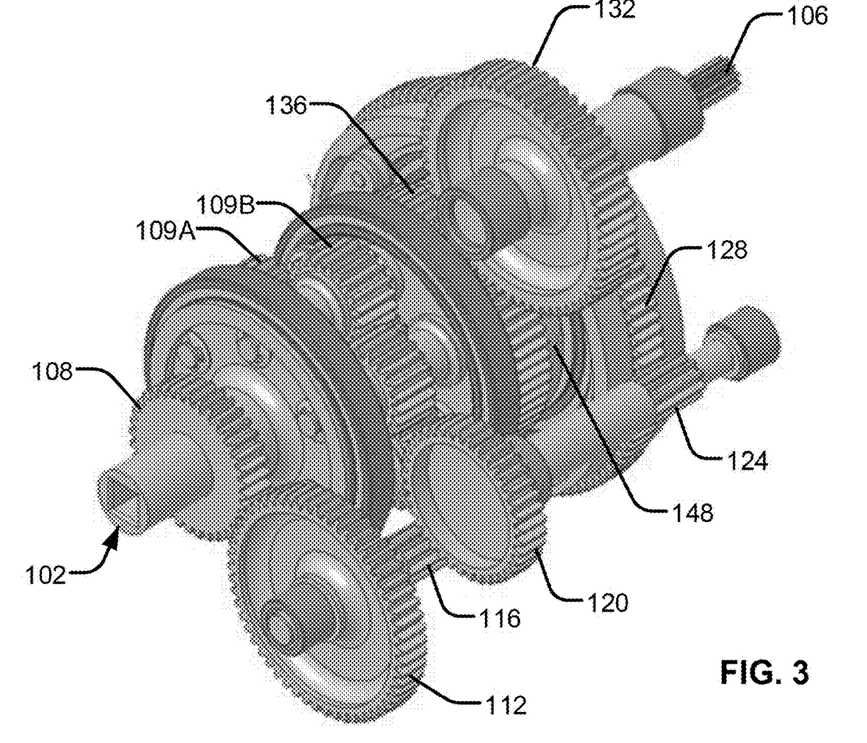
FIG. 3 illustrates a rear perspective view of the gear mechanism for multiple output systems of FIG. 1 with the housing removed, in accordance with an example embodiment of the disclosure.
Figure 4:
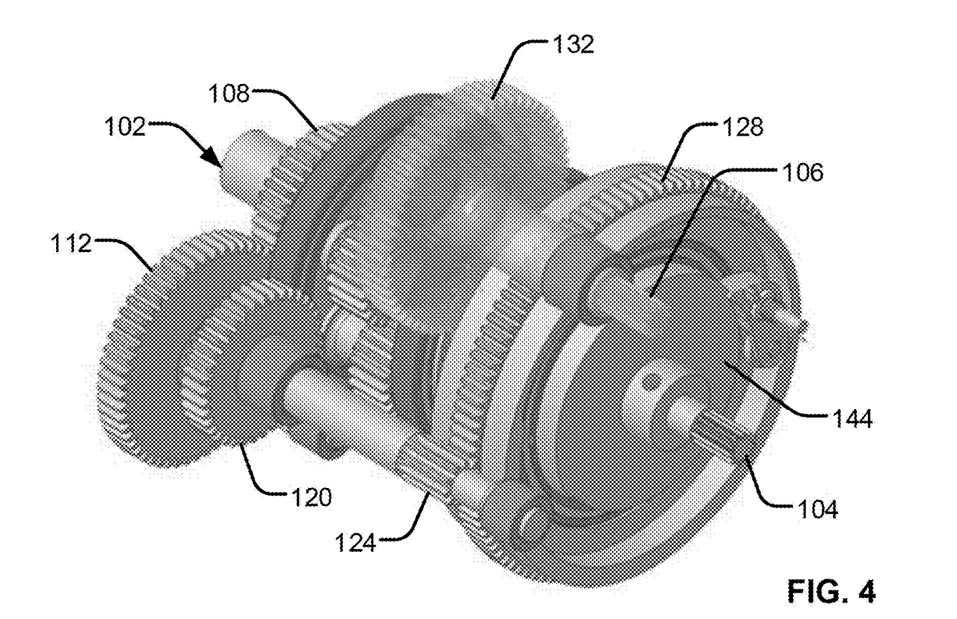
FIG. 4 illustrates a front perspective view of the gear mechanism for multiple output systems of FIG. 1 with the housing removed, in accordance with an example embodiment of the disclosure.

FIGS. 3 and 4 show perspective views of the gear mechanism 100 with its housing removed. FIG. 3 shows the input side of the gear mechanism 100, and FIG. 4 shows the output side of the gear mechanism 100. The input 102 is connected to a first input gear 108, which is configured to engage and rotate a second input gear 112. The second input gear 112 is connected to a shaft on which is mounted a third input gear 116. The third input gear 116 is configured to engage and rotate a fourth input gear 120. The fourth input gear 120 is connected to a shaft on which is mounted a fifth input gear 124. The fifth input gear 124 is configured to engage and rotate a primary ring gear 128. Thus, the first through fifth input gears 108, 112, 116, 120, and 124 transfer motion to the primary ring gear 128 and cause the primary ring gear 128 to rotate upon application of torque to the input 102 (via manual and/or electric means). The first through fifth input gears 108, 112, 116, 120, and 124 are part of a timing spur gear train that reduces the rotational speed of the primary ring gear 128 with respect to the speed at which the input 102 rotates.

The second output 106 extends from a shaft to which is mounted a sixth input gear 132. The sixth input gear 132 is configured to engage and be rotated by a seventh input gear 136.

A first locking plate or sprocket 144 is located on a first side of the primary ring gear 128, and a second locking plate or sprocket 148 is located on a second side of the primary ring gear 128. The locking plates 144 and 148 are configured to be driven (rotated) by the torque applied to the input 102. The first locking plate 144 is fixed to the first output 104, and the second locking plate 148 is fixed to the seventh input gear 136. Accordingly, rotation of the first locking plate 144 causes the first output 104 to rotate, and rotation of the second locking plate 148 causes the second output-106 to rotate (via rotation of the sixth and seventh input gears 132 and 136).

Figure 5:
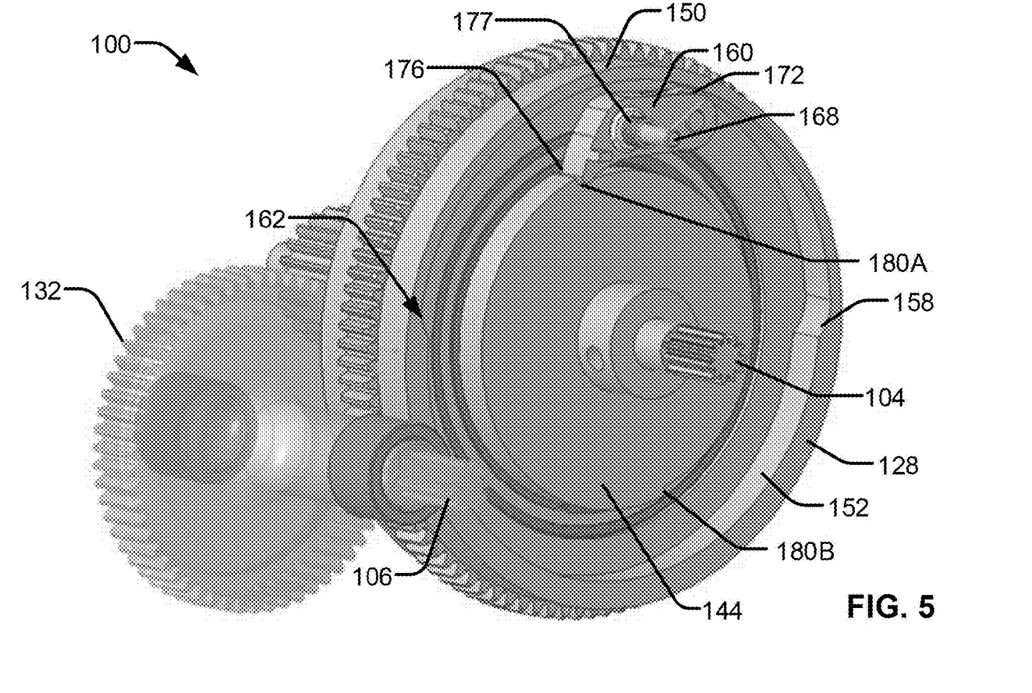
FIG. 5 illustrates a partial, front perspective view of the gear mechanism of FIG. 1, in accordance with an example embodiment of the disclosure.
Figure 6:
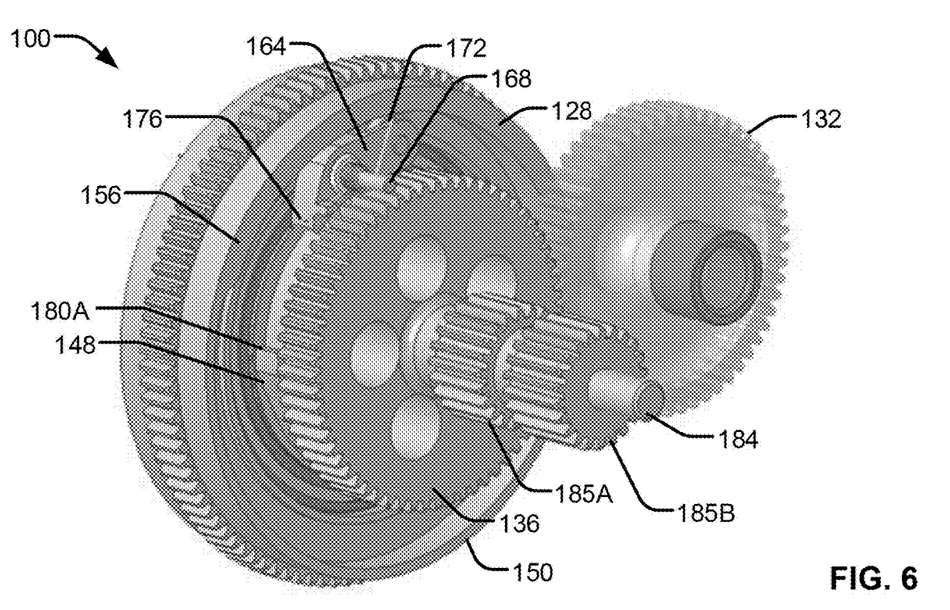
FIG. 6 illustrates a partial, rear perspective view of the gear mechanism of FIG. 1, in accordance with an example embodiment of the disclosure.

FIGS. 5 and 6 show partial, perspective views of the gear mechanism 100. FIG. 5 shows a first, or outward-facing, side of the primary ring gear 128, and FIG. 6 shows a second, or inward-facing, side of the primary ring gear 128. The primary ring gear 128 defines an interior rim 150 that includes first and second cam features 152 and 156 on opposite sides of the primary ring gear 128. The cam features 152 and 156 each include and are defined by first and second transitions 158 and 162. Each cam feature and/or its transitions can be integral with the primary ring gear 128 or may be separately machined and nested within the rim 150 of the ring gear 128 such that the cam transitions can be rotated and repositioned within the ring gear 128 as desired.

The ring gear 128 includes first and second pawls 160 and 164 on the first and second sides thereof, respectively. The pawls 160 and 164 are each mounted on a rod or rods 168. For example, each pawl can be mounted to a respective rod that extends from a fixture, such as the surrounding housing, and toward the ring gear 128. The rods do not extend to contact the ring gear 128, allowing the ring gear and each pawl to rotate independently of the other. Depending on specific applications and/or a desired timing output, the relative radial arrangement of the rods (and therefore the pawls) and the cams can be adjusted. Thus, engagement of the pawls with the cam, and a corresponding locking plate, can be independently selected. Moreover, opposing rods (e.g., that support pawls 160 and 164) can extend toward the ring gear 128 at any radial position, which may or may not mirror the position of the opposing rod).

Each pawl 160 and 164 is configured to rotate about their respective rod 168 and is configured to be secured to the rods 168 by, for example, a bushing or other suitable device. In some examples, a spring 177 or other biasing element can be employed to force the pawls toward the locking plate. The pawls 160 and 164 each include a roller 172 configured to engage the rim 150 and a cam feature 152, 156, and a locking tip 176 configured to engage a step 180 on a locking plate 144, 148. The first and second pawls 160 and 164 may be configured to be spring loaded to rotate counterclockwise so that the rollers 172 are pushed toward the rim 150. With respect specifically to FIGS. 5 and 6, the locking plates 144 and 148 are driven by a gear shaft 184 that is driven, directly or indirectly, by the input 102 (FIGS. 1-4). In some examples, the gear shaft 184 has a two-piece design, each piece being driven by one or more of gears 185A and 185B, each of which can be driven by one or more gears 109A and 109B (as shown in the example of FIG. 3). Gears 109A and 109B selectively drive gears 185A and 185B in response to torque applied at the input 102, as disclosed herein. The gear shaft 184 is configured to rotate with respect to the seventh input gear 136 through which the gear shaft 184 extends.

Operation of the gear mechanism 100 will be described with respect to FIGS. 5 and 6. The gear mechanism 100 is configured to sequentially drive the two outputs 104 and 106 (which are connected to and drive first and second actuators, respectively) through a single input 102 (via the two-piece shaft 184, illustrated in example FIGS. 1-4). In operation, torque is applied to the input 102 (manually or electrically) which causes the input 102 to rotate. Rotation of the input 102 causes the first and second locking plates 144 and 148 to move or rotate sequentially via the two-piece gear shaft 184 (which may connected to the input 102 through a variety of mechanical/gear connections). At the same time the input 102 is driving the locking plates 144 and 148, the input 102 is driving the primary ring gear 128 via the timing spur gear train made up of input gears 108, 112, 116, 120, and 124 (FIGS. 3-4). By way of example, the primary ring gear 128 rotates at a reduced speed vis a vis the first and second locking plates 144 and 148.

With respect to FIG. 5, the primary ring gear 128 is rotating counterclockwise, and the first locking plate 144 is rotating clockwise, and the first pawl 160 is fixed with respect to the ring gear 128 and the first locking plate 144. As the ring gear 128 rotates with the roller 172 of the first pawl 160 engaging the first cam feature 152, the locking tip 176 of the first pawl 160 does not engage the first locking plate 144. This allows the first locking plate 144, and thus, the first output 104, to rotate and drive the first actuator along a range of motion, e.g., extending it. As the primary ring gear 128 continues to rotate past the first pawl 160, the second cam transition 162 goes past the roller 172, and the first pawl 160 rotates counterclockwise about the rod 168 such that the roller 172 engages the rim 150. This causes the locking tip 176 to engage the first locking plate 144. As the first locking plate 144 rotates with respect to the first pawl 160, the step 180A engages the locking tip 176 of the first pawl 160, which prevents the first locking plate 144 from continuing to rotate. In this way, the first pawl 160 locks the first locking plate 144, and, thus, the first output 104, resulting in the locking of the first actuator in an extended state.

With respect to FIG. 6, at the same time or some selected time before or after the first locking plate 144 is locked, rotation of the ring gear 128 causes the second cam feature 156 to engage the second pawl 164, which causes the second pawl 164 to rotate clockwise around the rod 168 such that the locking tip 176 of the second pawl 164 moves away from and does not engage a step 180 on the second locking plate 148. This allows the second locking plate 148 to rotate. Rotation of the second locking plate 148 drives the gears 136 and 132, which, in turn, drive the second output 106 and, thus, causes the second actuator to move along a range of motion, e.g., to an extended position. As the primary ring gear 128 continues to rotate with respect to the second pawl 164, the second cam feature 156 passes the roller 172 of the second pawl 164, which causes the second pawl 164 to rotate counterclockwise about the rod 168 such that the roller 172 engages the rim 150 of the ring gear 128 and the locking tip 176 engages the second locking plate 148. The locking tip 176 engages a step 180 of the second locking plate 148 and stops rotation of the second locking plate 148. This locks the second output 106, and thus stops motion of the second actuator, locking it in an extended state.

Therefore, the mechanism 100 allows for the use of a single input to sequentially drive at least two different actuators to a full extension. It should be noted that the torque can be applied to the input 102 to reverse the direction of rotation of the primary ring gear 128 to sequentially cause the actuators to retract. That is, after the second actuator has been driven to full extension by the second output 106, the rotational direction of the primary ring gear 128 and first and second locking plates 144 and 148 can be reversed. This causes the second pawl 164, upon having the second cam feature 156 pass over it, to rotate clockwise about the rod 168 such that the locking tip 176 no longer engages the second locking plate 148. The locking plate 148 starts rotating and driving the second output 106, which causes the second actuator to retract. At or around this time, the first pawl 160 engages the rim 150 and rotates to engage a step 180 on the first locking plate 144 such that the first actuator cannot move. The rim 150 then passes the second locking pawl 164, causing the second pawl 164 to rotate such that its locking tip 176 engages the step 180 on the second locking plate 148, locking the second locking plate 148 and stopping motion of the second actuator at a fully retracted state. At or around this time, the first cam feature 152 engages the first pawl 160, which causes the first pawl 160 to rotate away from the first locking plate 144 such that the locking tip 176 disengages from the first locking plate 144. This unlocks the first locking plate 144 and allows it to rotate, which causes the first actuator to retract until it is fully retracted, at which time the first pawl 160 again gets passed by the first cam feature 152, engages the rim 150, and rotates. Rotation can serve to lock the first locking plate 144, or the locking plate 144 can remain disengaged (e.g., unlocked) based on a particular application for the mechanism 100.

At this point, the cycle of sequentially extending and retracting the first and second actuators can be operated in reverse. Once reset, the cycle can begin again.

The mechanism 100 uses spur gearing and cam features that are sized and positioned based on the travel requirements (or the stroke) of each actuator. The size, shape, and location of the cam features 152, 156, locking plates 144, 148, pawls 160, 164, gears 112, 116, 120, 124, 132, and 136, and primary ring gear 128, and the speeds that the primary ring gear 128 and locking plates 144, 148 are driven at, are selected to drive the first and second actuators sequentially along specific ranges of motion (full strokes of extension and retraction) for a specific amount of time.

Figure 7:
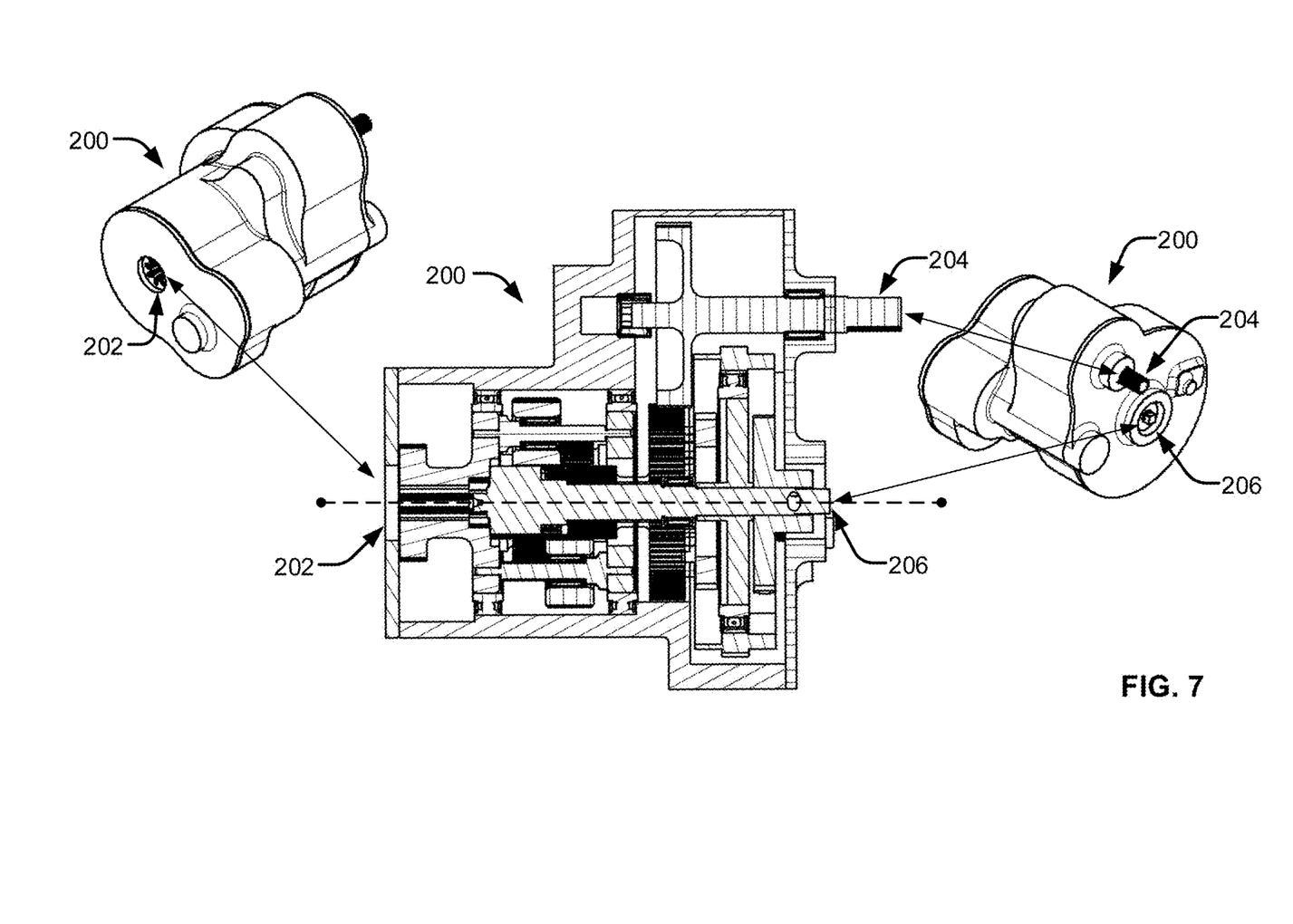
FIG. 7 illustrates a cross-sectional view and multiple perspective views of a gear mechanism for multiple output systems, in accordance with an example embodiment of the disclosure.
Figure 8:
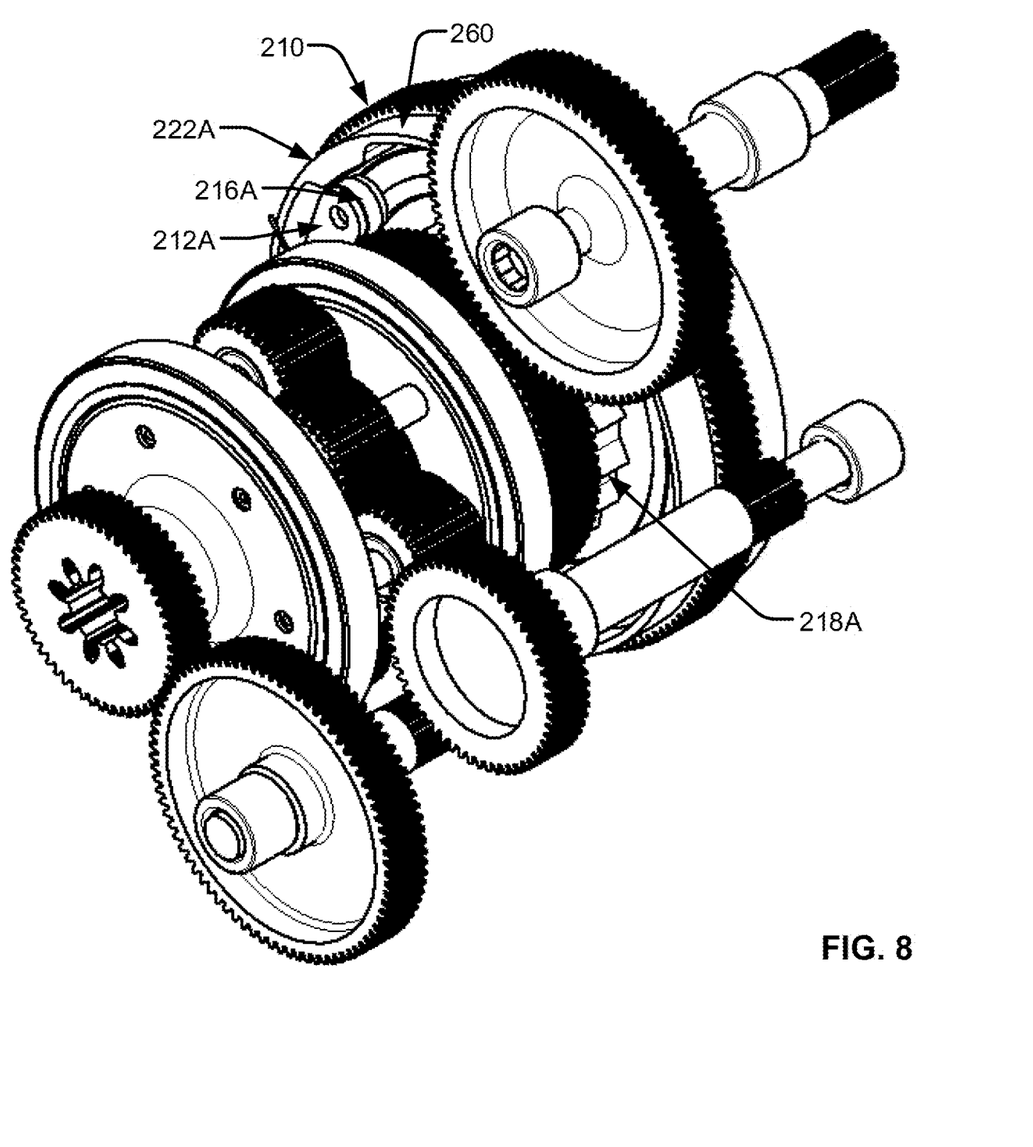
FIG. 8 illustrates a perspective view of several gears of the gear mechanism for multiple output systems of FIG. 7, in accordance with an example embodiment of the disclosure.
Figure 9:
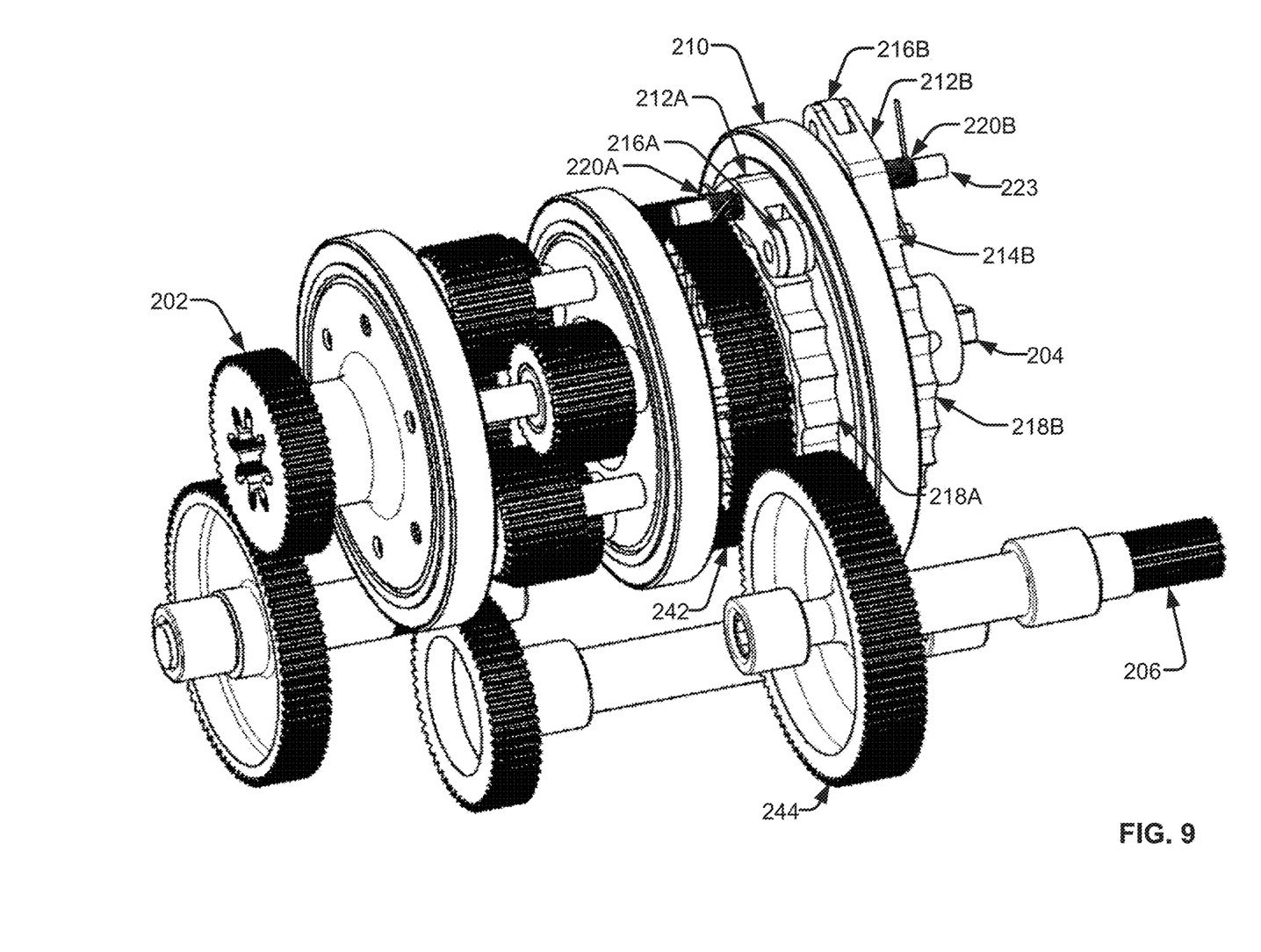
FIG. 9 illustrates another perspective view of the several gears of the gear mechanism for multiple output systems of FIG. 7, in accordance with an example embodiment of the disclosure.

FIG. 7 is a perspective view of a multi-branch epicyclic differential output mechanism 200, in accordance with another example embodiment of the disclosure. FIGS. 8 and 9 show perspective view of the mechanism 200 with its housing removed. The gear mechanism 200 shown in FIGS. 7-9 includes an input 202 and employs a series of connected gears to drive the first and second outputs 204, 206, and a peripheral gear train to drive a primary ring gear 210. The mechanism operates similarly to the mechanism 100 shown in FIGS. 1-6. The primary ring gear 210 may include one or more sprockets 218A, 218B that are configured to rotate like the locking plates 144, 148 of the mechanism 100, as well as a first cam feature 222A (and/or one or more additional or alternative cam features, not shown), positioned around and on either side of the primary ring gear 210. The sprocket 218B is connected to the output 204 such that rotation of the sprocket 218B causes the output 204 to rotate. The sprocket 218A is connected to a gear 242, which engages gear 244 of output 206 such that rotation of the sprocket 218A causes gear 244 and, thus, output 206 to rotate.

One or more rods 223 extend from the housing (or other mount external to the gear mechanism) toward the primary ring gear 210. Ratcheted locking pawls 212A and 212B are mounted to the rods 223 on opposite sides of the primary ring gear 210 and have locking tips 214A and 214B that are configured to engage the sprockets 218A and 218B, respectively. The pawls 212A, 212B are biased by a spring 220A, 220B and operable to pivot about the rods 223. Each locking pawl may be equipped with a roller 216A, 216B, to follow the interior surface of the ring gear 210, to reduce friction on the locking pawl as it engages with the cam feature and rim. When the locking tip 214A of locking pawl 212A engages the sprocket 218A, the sprocket 218A is locked, which stops movement of the second actuator. Similarly, when the locking tip 214B of locking pawl 212B engages sprocket 218B, the sprocket 218B is locked, which stops movement of the first actuator.

The location of the cam feature 222A corresponds to a time (within the sequence of operation) and a duration, such that, when the primary ring gear 210 is rotated with respect to the sprocket 218A (in a manner similar to that disclosed with respect to the embodiment in FIGS. 1-6), contact with the cam feature 122A causes the locking tip of the locking pawl 212A to disengage from the sprocket 218A, and contact with the rim 260 of the primary ring gear 210 causes the locking tip of the locking pawl 212A to engage the sprocket 218A. Another cam feature (not shown) can be located on the other side of the primary ring gear 210 and engage the locking pawl 222B in the way cam feature 122A engages locking pawl 212A.

In other words, dimensions of the cam feature(s) are selected to force engagement and disengagement of the pawl(s) with the sprocket(s), wherein disengagement thereby drives rotation of a corresponding gear and/or output and engagement results in locking of the corresponding gear and/or output.

As with the embodiment shown in FIGS. 1-6, in some examples, the engagement, and, therefore, rotation of the corresponding output, is defined by a desired sequence of operation. For instance, where the first cam feature 222A causes disengagement of the first locking pawl 212A against sprocket 218A, a second cam feature (opposite the first cam feature 222A—not shown) may cause disengagement of the second locking pawl 212B from the sprocket 218B.

Also as with the embodiment shown in FIGS. 1-6, the location and length of the first cam feature 222A may correspond to a void in the second cam feature, such that, when the first output 204 is being driven, the second output 206 is not, and vice versa. Thus, in this example, as each actuator approaches the end of travel, the cam features are spaced along opposite sides of the primary ring gear 210 to engage or disengage respective locking pawls with respect to a sprocket connected to each output 204, 206.

Although illustrated in the embodiments as being arranged within an interior of the primary ring gear, in some examples the cam features shown in the embodiments disclosed herein may extend laterally from the primary ring gear. The cam features are illustrated with a defined length, corresponding to a portion of an arc of the interior of the primary ring gear, and a defined depth, to trigger a desired amount of movement by a pawl (and therefore a locking mechanism). In some examples, the cam feature may have a greater or lesser arc length. As stated above, a first cam feature opposite a second cam feature may engage and disengage in an opposite pattern, thereby ensuring that the first output is driven when the second cam feature is not, and vice versa. The cam features may be separate from the ring gear and may be inserted into the ring gear at desired positions and adjusted within the ring gear.

Although some examples describe operation of the first or second outputs 104, 106 being exclusive to the other, in other examples the cam features can be designed to allow for simultaneous or overlapping drive of the first and second outputs 104, 106. The time at which each output is driven in the sequence, and the duration of this output, can be selected based on specific applications in which the gear mechanism is being employed.

Additionally, although some examples describe first and second outputs being driven by selective engagement of the ratcheting pawls and sprockets, in other examples three, four, or more outputs are controlled in this manner. Indeed, in some examples, additional mechanical channels can be included as necessary to support additional actuation outputs. For instance, modifications to the cam feature(s) can support three or more sequential (or selectively engaged) outputs. For example, multiple cams may be arranged at different axial depths of the primary ring gear on one or both sides, thereby multiplying the capabilities of the sequential drive gear mechanism.

As illustrated in the several figures, the disclosed gear mechanism employs spur gearing and cam features positioned about the ring gear to control the travel requirements of each output (e.g., corresponding to a connected actuator). In some examples, as each actuator reaches the end of travel, the cam features engage or disengage a spring loaded ratcheted locking pawl with a sprocket feature on each output of the gear differential. These locking features ground each differential output to the housing structure accordingly based on the actuator sequencing requirements of the specific application.

Figure 10:
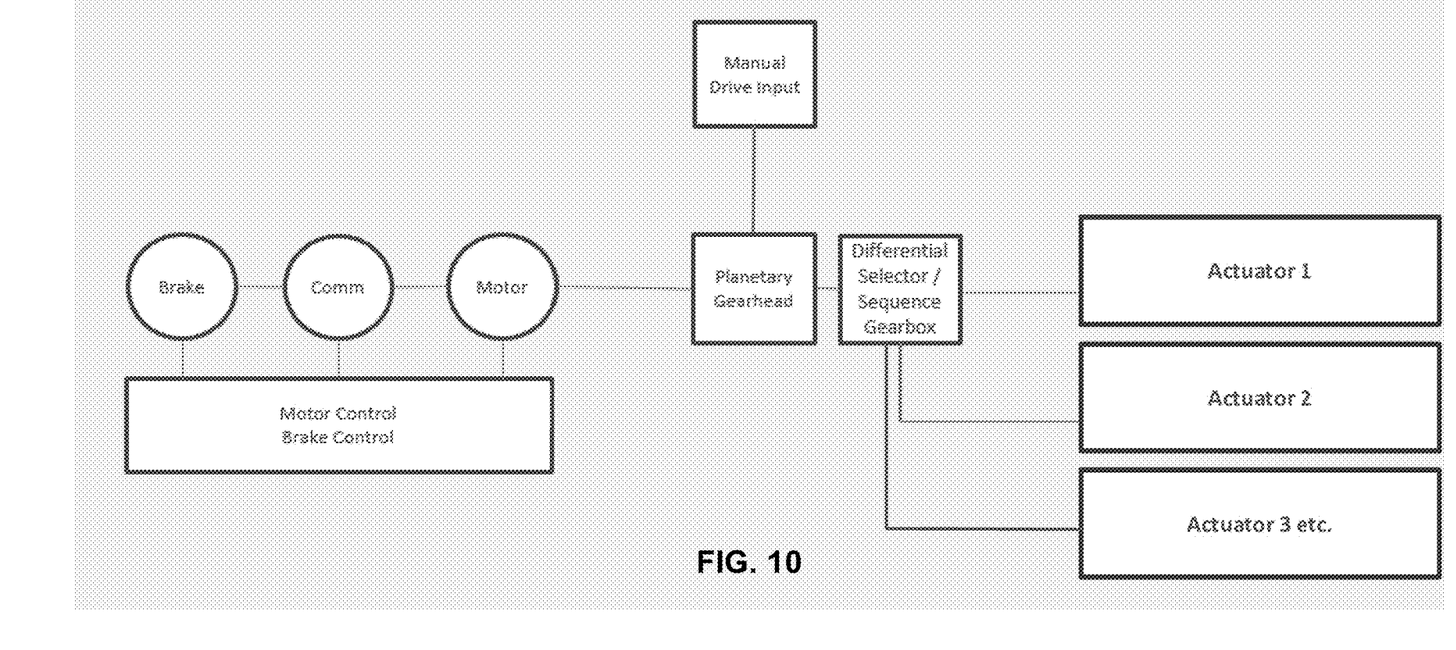
FIG. 10 illustrates a schematic of the gear mechanism for multiple output systems connected to one or more control systems and configured to drive first and second actuators, in accordance with example embodiments of the disclosure.

As shown in FIG. 10, in some examples, the disclosed gear mechanisms may be operable to drive two or more outputs connected to corresponding linear actuators in a sequential order, with only one manual or electric drive input being required to operate the actuators in the sequential order. Additional outputs can be added to the mechanism, i.e., the differential selector/sequence gearbox, by expanding the differential for 2 or more outputs. Cam features can be added or expanded for each additional output. For example, additional cam transition points and pawls can be added to the mechanism for each additional output. The disclosed solution leverages internal actuator mechanical stops as grounding paths for the selected, sequential operation.

The input is driven either mechanically or electrically by offset gearing or a direct drive. Each of two or more differential outputs is mechanically connected to a linear or rotary actuation output. The differential output channels are allowed to move based on the desired sequenced channel being unlocked, and the other channel(s) being locked or grounded.

As disclosed herein, activation/deactivation of a particular actuator can be achieved via activation or deactivation of a brake control system, grounding mechanism, or other suitable technique. For example, a brake control system may include electrical or mechanical brakes. Electrical brakes may be actuated by applying or removing power to their inputs, thereby engaging or disengaging the braking action.

Mechanical brakes may be configured by mechanical force, such as by applying linear or rotational force to an input of the brakes.

In an example, the source of driving torque may be a motor, which may include an electrical, hydraulic, or pneumatic motor. In the case of electric motors, it may include a brushless DC motor, brushed DC motor, AC induction motor, or stepper motor, although other motors may be utilized based on available space and power requirements, for example. In some examples, torque may be transferred by one or more transmissions, such as a clutch, belting system, or other systems or methods of transferring power from a power source.

An advantage of the disclosed gear mechanism is the compact size achieved through the specific arrangement of the gears. This particular design approach also reduces the number of support bearings required versus a more traditional way of achieving multiple branch outputs, as described above. The compact size of this design leads to other advantages when the device is integrated within a larger torque distribution assembly, where its compact envelope and versatility of placement provide a significant advantage for use in constricted spaces.

Figure 11A:
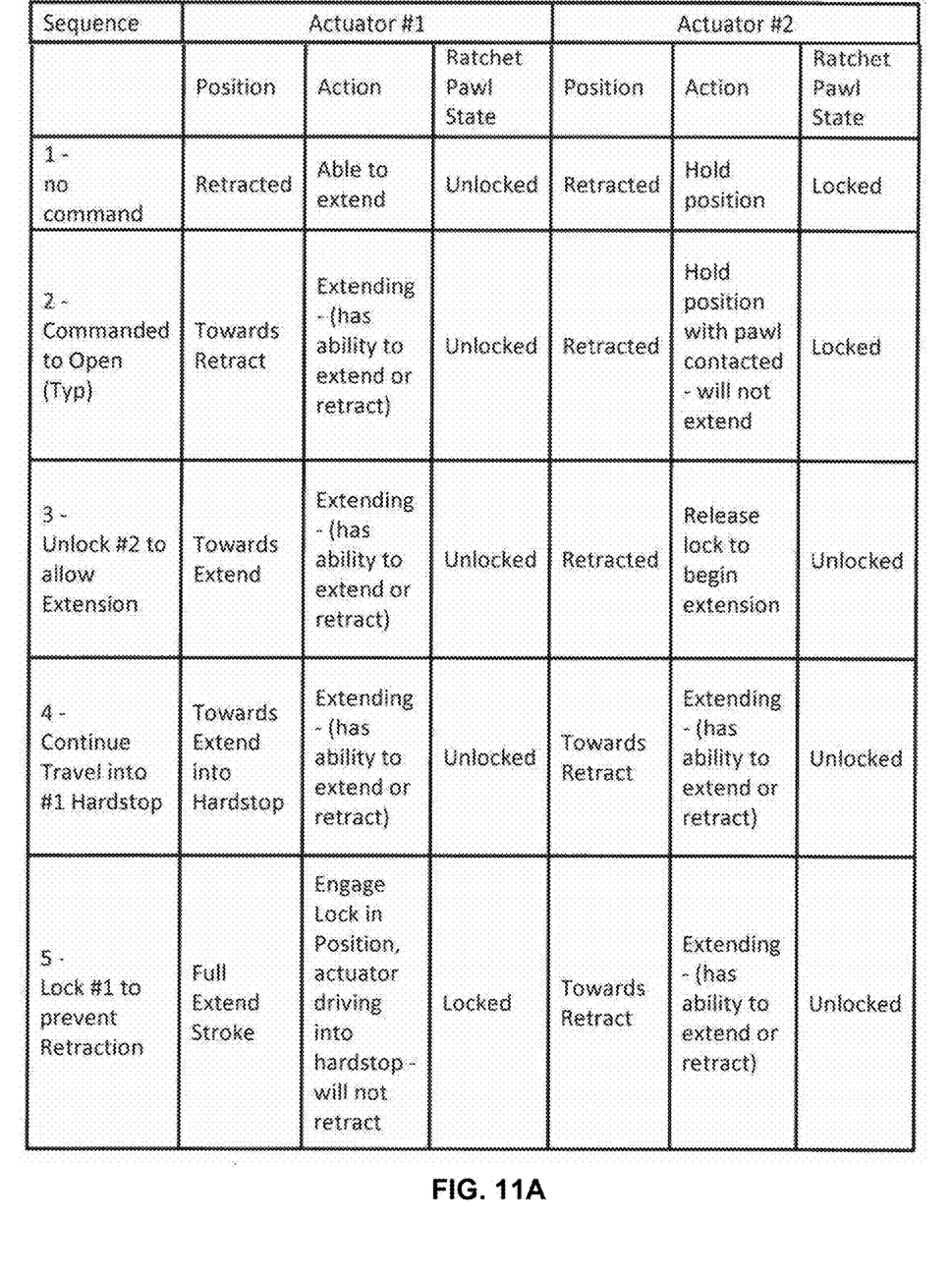
FIGS. 11A to 11C illustrate an example sequence of operation for the gear mechanism embodiments of the disclosure.
Figure 11B:
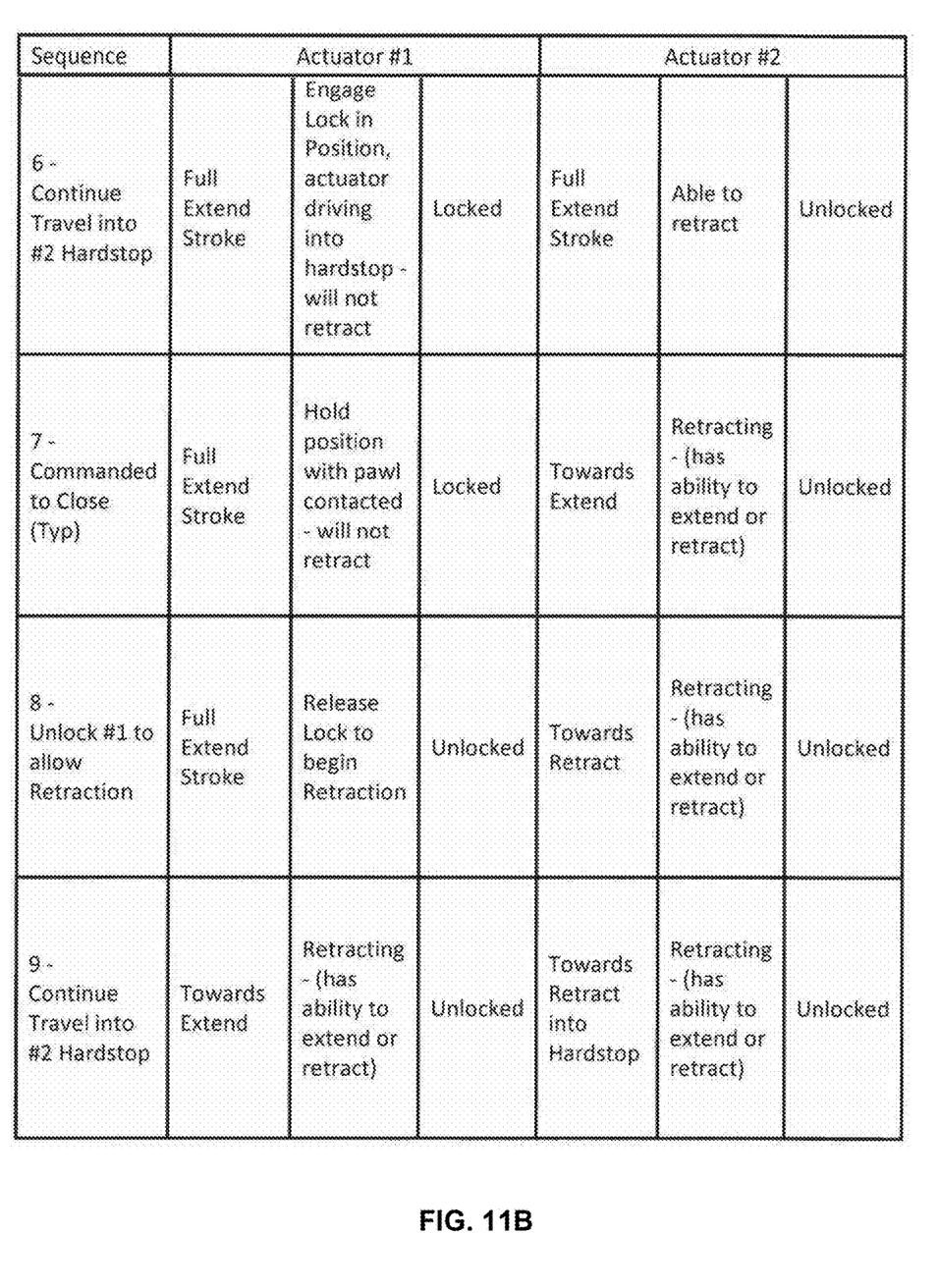
Figure 11C:
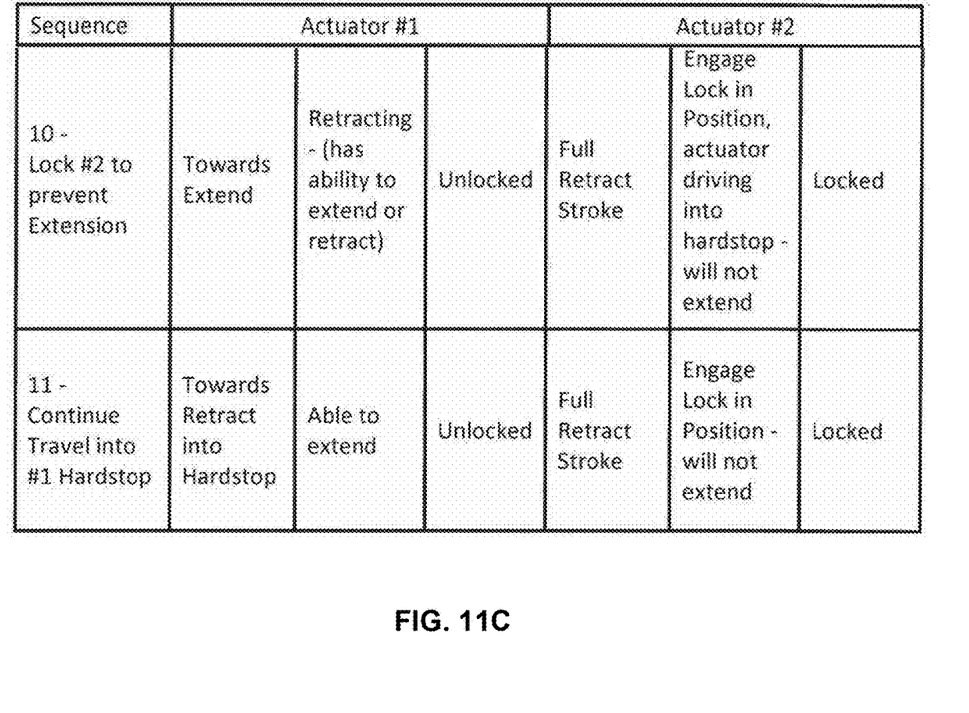

FIGS. 11A to 11C illustrate an example sequence of operation for a gear mechanism, in accordance with the example embodiments of the disclosure. By way of example only, the sequence is described with respect to unlocking, opening, closing, and locking a door. As shown, the sequence is presented in eleven blocks that describe actions of the gear mechanism, outputs, and/or connected actuators. As provided, the gear mechanism has at least two functional transmission paths: 1) driving transmission from the input through the gearing along a central axis to the two outputs containing the sprockets or locking plates; and 2) grounding mechanism timing from the input through the peripheral gearing to the ring gear containing the cam features.

In particular, at step 1 of the sequence, the first actuator is in the retracted position but is able to extend and is unlocked while the second actuator is in the retracted position and is locked and held in that position. At this point, the door is locked and closed. At step 2, an activation command, e.g., to open the door, is made, and the first actuator (which may be used to lock and unlock the door) begins extending from the retracted state and remains unlocked while the second actuator (which may be used to open and close the door) remains locked and in the retracted state. At step 3, the first actuator remains unlocked and continues to extend toward its fully extended state while the second actuator has been unlocked but is still in the retracted position. At this point, the door is being unlocked. At step 4, the first actuator remains unlocked and continues to extend to its hard stop while the second actuator is unlocked and begins extending from its retracted state. At step 5, the first actuator has reached its full extended state and is locked in its hard stop position while the second actuator remains unlocked continues to extend from its retracted state. At this point, the door is unlocked and is beginning to open. At step 6, the first actuator remains locked in its fully extended, hard stop position, and the second actuator remains unlocked has reached the full extension of its stroke. At this point the door is open. At step 7, an activation command (e.g., close the door) is made, and the first actuator is at its full extension and is locked in that position while the second actuator is unlocked and begins retracting from its full extension position. At step 8, the first actuator is unlocked but is still in its full extension position, and the second actuator remains unlocked and is continuing to retract. At this point, the door is closing. At step 9, the first actuator remains unlocked and is retracting from its full extension state, and the second actuator is unlocked and continues to retract toward its hard stop position. At this point the door is almost closed. At step 10, the first actuator remains unlocked and is continuing to retract while the second actuator is locked in a fully retracted, hard stop position. At this point the door is closed and is being locked. At step 11, the first actuator has retracted to its hard stop position and remains unlocked, and the second actuator remains locked in a fully retracted hard stop position. At this point, the door is closed and locked.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A gear mechanism comprising:
an input to receive mechanical torque;
a primary ring gear including first and second cam features along an interior of the primary ring gear, the primary ring gear being driven to rotate by the input;
first and second locking plates, the first and second locking plates being sprockets;
first and second locking pawls operable to engage and disengage the first and second locking plates, respectively, in response to a position of the first and second cam features along the interior of the primary ring gear, wherein the first and second locking plates are operable to lock and unlock based on a position of the first and second cam features relative to the first and second locking pawls; and
first and second outputs being mechanically connected to the first and second locking plates, respectively, the first and second outputs operable to be driven by rotation of the input based on disengagement of the first and second locking pawls with the first and second locking plates, respectively.

2. The gear mechanism of claim 1, wherein the first and second pawls are positioned on opposite sides of the primary ring gear.

3. The gear mechanism of claim 2, wherein the first and second pawls are rotatably mounted to one or more rods extending from a housing toward the primary ring gear.

4. The gear mechanism of claim 2, wherein when a first locking tip of the first pawl engages the first locking plate, the first output is locked, and when a second locking tip of the second pawl engages the second locking plate, the second output is locked.

5. The gear mechanism of claim 1, wherein the first and second pawls include first and second locking tips, respectively, that are configured to lockingly engage the first and second locking plates, respectively.

6. The gear mechanism of claim 5, wherein the first and second pawls engage the first and second locking plates, respectively, in a sequence.

7. The gear mechanism of claim 1, wherein the primary ring gear rotates to a first point where the first cam feature engages the first pawl, causing the first pawl to disengage from the first locking plate such that the first locking plate can rotate and drive the first output.

8. The gear mechanism of claim 7, wherein the primary ring gear rotates to a second point where the first cam feature no longer engages the first pawl, causing the first pawl to rotate toward the first locking wheel and lockingly engage the first locking wheel such that the first output is locked.

9. The gear mechanism of claim 1, wherein, the first and second pawls include first and second rollers, respectively, that follow an interior rim of the primary ring gear and that engage the first and second cam features, respectively.

10. The gear mechanism of claim 1, wherein the first and second locking plates each have at least one step for engaging the first and second pawl, respectively.

11. The gear mechanism of claim 1, wherein the primary ring gear is driven by a timing spur gear train that is driven by the input.

12. A gear mechanism comprising:
an input to receive mechanical torque;
a primary ring gear including first and second cam features along first and second interior rims of the primary ring gear, the primary ring gear being driven to rotate by the input;
first and second locking plates on opposite sides of the primary ring gear that are configured to rotate with respect to the primary ring gear;
first and second locking pawls on opposite sides of the primary ring gear that are operable to engage and disengage the first and second locking plates, respectively, in response to a position of the first and second cam features along the first and second interior rims, respectively, of the primary ring gear; wherein the first and second pawls are configured to rotate toward and engage the first and second locking plates, respectively, when the first and second pawls engage the first and second interior rims, respectively, and the first and second pawls are configured to rotate away and disengage from the first and second locking plates, respectively, when the first and second pawls engage the first and second cam features, respectively, wherein the first and second locking plates are operable to lock when engaged by the first and second pawls, respectively, and unlock when disengaged from the first and second locking pawls, respectively; and
first and second outputs being mechanically connected to the first and second locking plates, respectively, the first and second outputs operable to be driven by rotation of the input based on disengagement of the first and second locking pawls with the first and second locking plates, respectively.

13. The gear mechanism of claim 12, wherein the first and second pawls engage the first and second locking plates, respectively, in a sequence.

14. The gear mechanism of claim 13, wherein the first and second pawls include locking tips, and when a first locking tip of the first pawl engages the first locking plate, the first output is locked, and when a second locking tip of the second pawl engages the second locking plate, the second output is locked.

15. The gear mechanism of claim 12, wherein the primary ring gear rotates to a first point where the first cam feature engages the first pawl, causing the first pawl to disengage from the first locking plate such that the first locking plate can rotate and drive the first output.

16. The gear mechanism of claim 15, wherein the primary ring gear rotates to a second point where the first cam feature no longer engages the first pawl, causing the first pawl to rotate toward the first locking wheel and lockingly engage the first locking wheel such that the first output is locked.

17. The gear mechanism of claim 12, wherein, the first and second pawls include first and second rollers, respectively, that roll along the first and second interior rims, respectively, and that rollingly engage the first and second cam features, respectively.

18. The gear mechanism of claim 12, wherein the first and second locking plates each have at least one step for engaging the first and second pawls, respectively.

19. A gear mechanism comprising:
an input to receive mechanical torque;
a primary ring gear including first and second cam features along first and second interior rims of the primary ring gear, the primary ring gear being driven to rotate by the input;
first and second locking plates on opposite sides of the primary ring gear that are configured to rotate with respect to the primary ring gear;
first and second locking pawls on opposite sides of the primary ring gear that are configured to rotate with respect to the primary ring gear and the first and second locking plates and that include first and second rollers, respectively,
wherein, the primary ring gear rotates to (i) a first point where the first roller of the first locking pawl rolls along the first cam feature, which causes the first locking pawl to be disengaged from the first locking wheel, and the second roller of the second locking pawl rolls along the second interior rim, which causes the second locking pawl to be positioned to lockingly engage the second locking wheel, and (ii) a second point where the first roller of the first locking pawl rolls along the first rim, which causes the first locking pawl to be positioned to lockingly engage the first locking wheel, and the second roller of the second locking pawl rolls along the second cam feature, which causes the second locking pawl to be disengaged from the second locking wheel, and
first and second outputs that are mechanically connected to the first and second locking plates, respectively, the first and second outputs operable to be driven by rotation of the input based on disengagement of the first and second locking pawls with the first and second locking plates, respectively.

* * * * *